United States Patent
Tokar

(10) Patent No.: US 6,235,195 B1
(45) Date of Patent: May 22, 2001

(54) FILTER ELEMENT INCORPORATING A HANDLE MEMBER

(75) Inventor: Joseph C. Tokar, Apple Valley, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 0 days.

(21) Appl. No.: 09/259,489

(22) Filed: Feb. 26, 1999

(51) Int. Cl.[7] .................................................. B01D 27/06
(52) U.S. Cl. ..................... 210/238; 210/470; 210/492; 210/493.4; 55/357; 55/502; 55/521
(58) Field of Search ................................. 210/238, 450, 210/470, 492, 493.4, 497.1, 493.1, 493.2; 55/521, 498, 502, 357; 16/DIG. 12

(56) References Cited

U.S. PATENT DOCUMENTS

| | | |
|---|---|---|
| 2,599,604 | 6/1952 | Bauer et al. . |
| 2,890,796 * | 6/1959 | Blood .................................. 210/470 |
| 2,914,785 * | 12/1959 | Ela .................................. 16/DIG. 12 |
| 3,025,963 * | 3/1962 | Bauer .................................. 210/493.4 |
| 3,209,917 * | 10/1965 | Yelinek .................................. 55/357 |
| 3,912,631 * | 10/1975 | Turman .................................. 210/439 |
| 4,065,341 * | 12/1977 | Cub .................................. 55/498 |
| 4,255,175 | 3/1981 | Wilkins . |
| 4,394,147 | 7/1983 | Caddy et al. . |
| 4,678,489 | 7/1987 | Bertelsen . |
| 4,767,531 * | 8/1988 | Holzer .................................. 210/238 |
| 5,069,790 | 12/1991 | Mordeki . |
| 5,211,846 * | 5/1993 | Kott et al. .................................. 210/232 |
| 5,472,463 | 12/1995 | Herman et al. . |
| 5,536,290 | 7/1996 | Stark et al. . |
| 5,601,717 | 2/1997 | Villette et al. . |
| 5,820,646 | 10/1998 | Gillingham et al. . |

FOREIGN PATENT DOCUMENTS

| | | | |
|---|---|---|---|
| 1171615 * | 7/1989 | (JP) .................................. 210/492 |
| WO 97/40917 | 11/1997 | (WO) . |

* cited by examiner

Primary Examiner—Matthew O. Savage
(74) Attorney, Agent, or Firm—Merchant & Gould P.C.

(57) ABSTRACT

A filter arrangement includes a filter element configured for straight through flow and a handle member secured to the filter element. The filter element may typically have a plurality of flutes where selected ones of the flutes are open at upstream portions and closed at downstream portions, and where selected ones of the flutes are closed at the upstream portions and open at the downstream portions. In one embodiment, the handle member is secured to the central core member. In some embodiments, the handle member and the central core member are a single molded construction. The handle member can include a single aperture, such as an elongated slot, or a plurality of apertures. A method for servicing a system having a straight through flow filter element includes grasping a handle secured to the filter element, and pulling the handle to remove the filter element from the system.

18 Claims, 5 Drawing Sheets

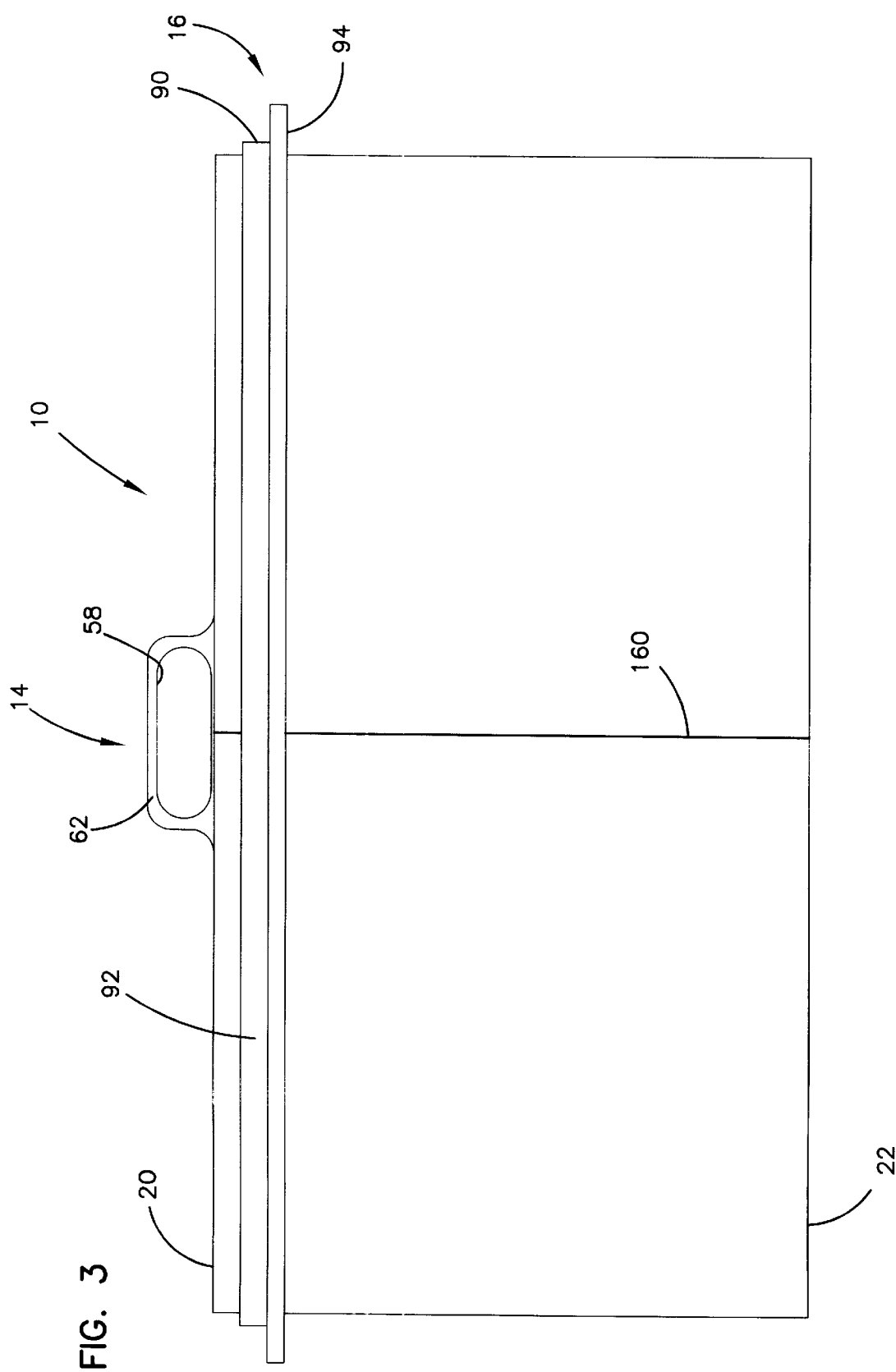

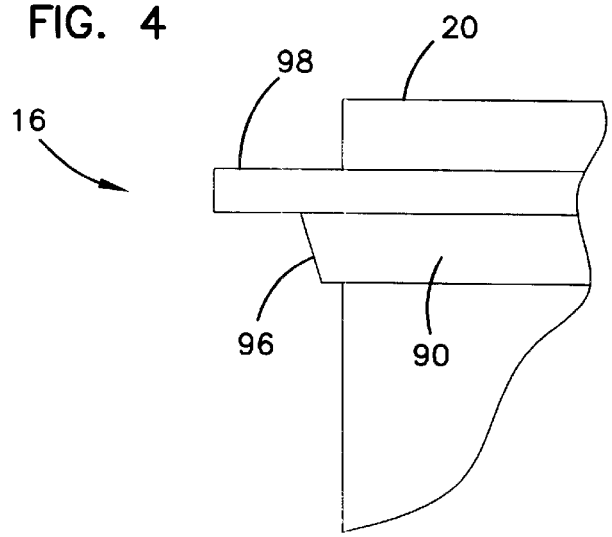
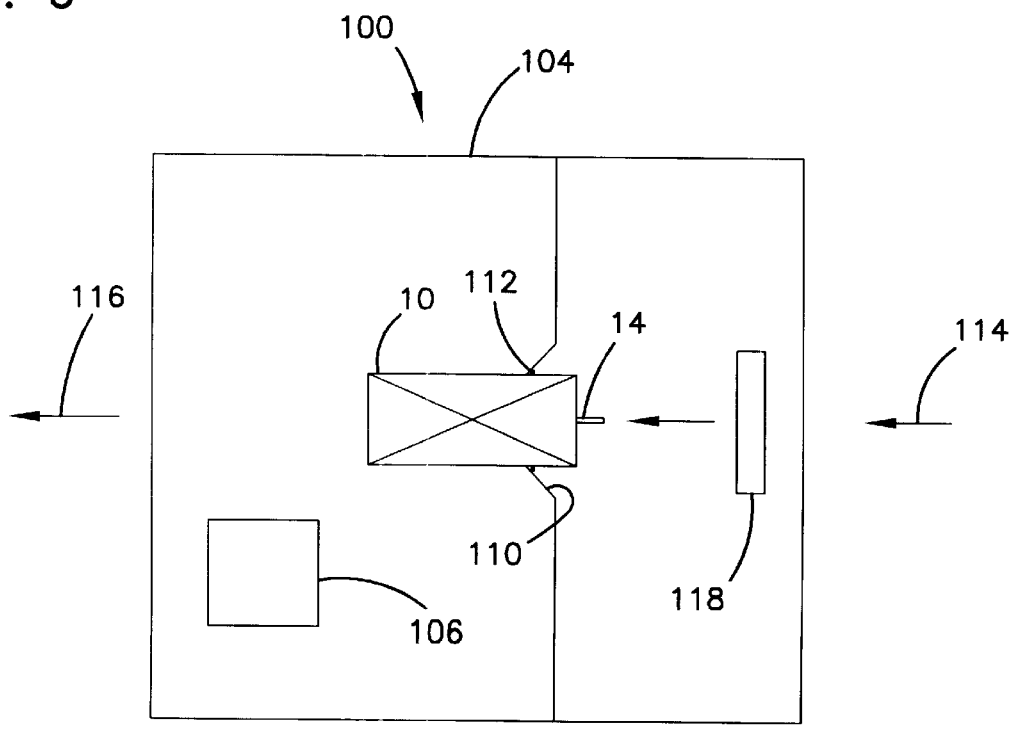

FILTER ELEMENT INCORPORATING A HANDLE MEMBER

FIELD OF THE INVENTION

This disclosure describes filter constructions for filtering fluids, such as gas or liquid. In particular, the disclosure describes a filter element having a handle.

BACKGROUND OF THE INVENTION

Straight through flow filter elements have been used in systems for cleaning fluid passing therethrough. Straight through flow filter elements typically will have an inlet face and an oppositely disposed outlet face. In this manner, fluid flows in one certain direction upon entering the filter element at the inlet face and will have the same direction of flow as it exits the outlet face. Typically, straight through flow filter elements will be installed in a duct or housing of some sort. After a period of use, the filter element will require servicing, either cleaning or a complete replacement. If it is difficult or inconvenient to service the filter element, the user may delay the proper servicing, which can cause damage to whatever system is being filtered. Improvements to straight through flow filter elements are desirable.

SUMMARY OF THE DISCLOSURE

One aspect of the disclosure describes a filter arrangement. In certain implementations, the filter arrangement includes a filter element and a handle member secured to the filter element. The filter element is configured for straight through flow. For example, the filter element may typically have opposite first and second ends and a plurality of flutes. Each of the flutes has an end portion adjacent to the filter element first end, and a second end portion adjacent to the filter element second end. Alternating first end portions and second portions of adjacent flutes are closed. The handle member will typically be constructed and arranged to accommodate a grasping force applied by portions of a human hand.

Preferably, the filter element includes a central core member, with the flutes forming a coil around the central core member.

In preferred embodiments, the handle member is secured to the central core member.

In another aspect, the disclosure describes a system having a filter element installed in a duct in the system. The filter element may be configured for straight through flow. A method for servicing the system can include grasping a handle secured to the filter element, and pulling the handle to remove the filter element from the duct in the system.

BRIEF DESCRIPTION OF THE DRAWINGS

FIG. 3 is a front elevational view of the filter element depicted in FIG. 1, according to principles of the present disclosure.

FIG. 4 is a fragmented, enlarged, front elevational view of an alternate embodiment of a seal member mounted on the filter element of FIG. 1, according to principles of the present disclosure.

FIG. 6 is a schematic view of a system that uses the filter element of FIGS. 1 and 3–5, according to principles of the present disclosure.

DETAILED DESCRIPTION

A. FIGS. 1–5

Figure 1:
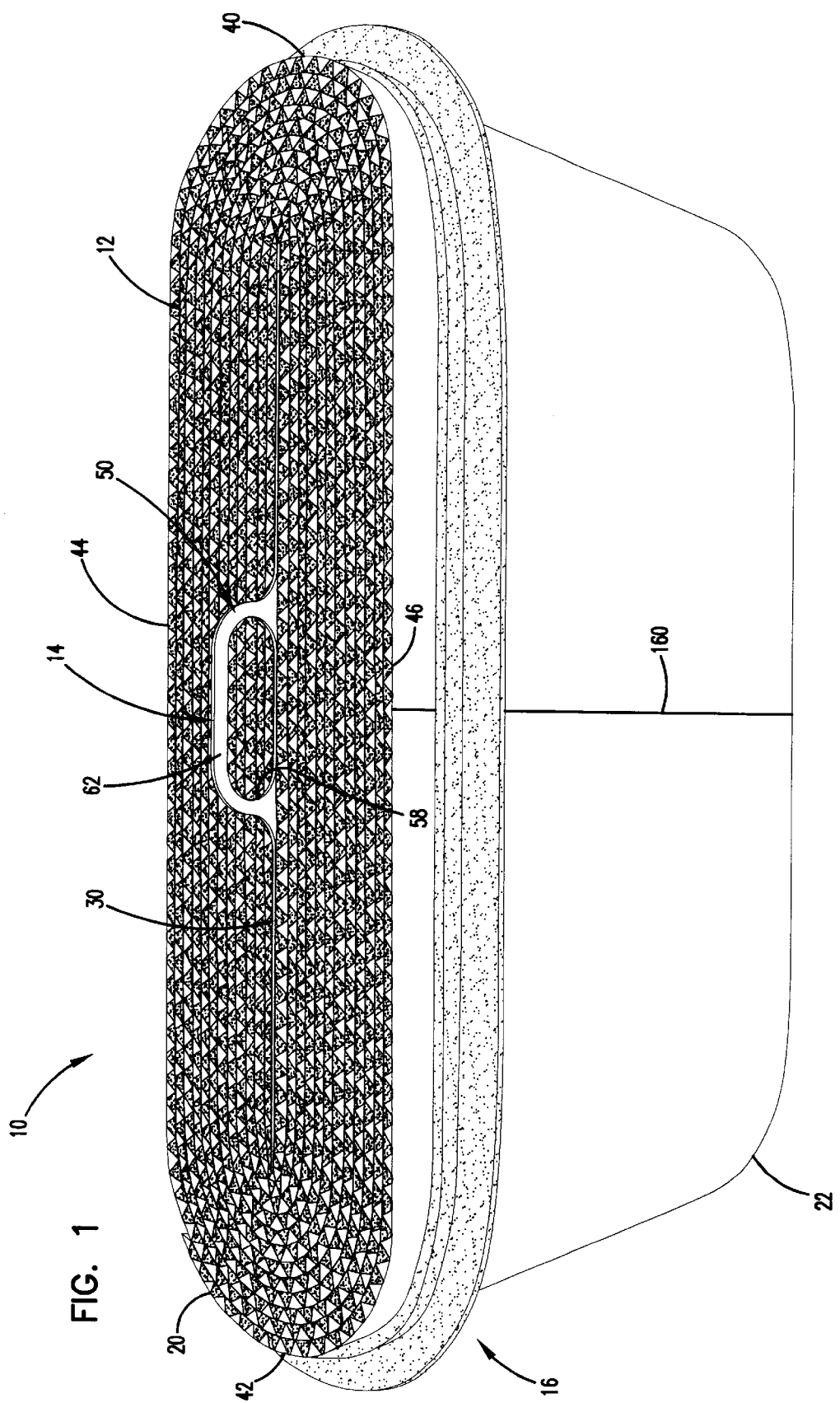
FIG. 1 is a perspective view of one embodiment of a filter element, according to principles of the present disclosure.

Attention is directed to FIG. 1. FIG. 1 is a perspective view of one embodiment of a filter pack or filter element 10. Preferably, the filter element 10 includes filtering media 12, a handle system 14, and a sealing system 16. The filtering media 12 is designed to remove particulates from a fluid, such as air, passing through the filtering media 12. The handle system 14 is preferably constructed to permit convenient manipulation and handling of the filter element 10, particularly during servicing or change out. The sealing system 16 is designed to help create a seal between the filtering media 12 and an inner wall of a duct.

Still referring to FIG. 1, the filter element 10 is configured to permit straight through flow. By the term "straight through flow," it is meant that the fluid flows directly through the filter element 10, entering at an inlet face and exiting at an oppositely disposed outlet face, wherein the direction of fluid flow entering the inlet face is the same direction of the fluid flow exiting the outlet face. For example, the filter element 10 defines a first end 20 and an oppositely disposed second end 22. In some arrangements, the first end 20 will correspond to an upstream face or end, while the second end 22 will correspond to a downstream face or end. In certain other arrangements, the first end 20 can be the downstream end, while the second end 22 can be the upstream end. The straight through flow allows gas to flow into the first end 20 and exit the second end 22, such that the direction of the airflow into the first end 20 is the same direction of the airflow that is exiting the second end 22. Straight through flow patterns can reduce the amount of turbulence in the gas flow.

Figure 2:
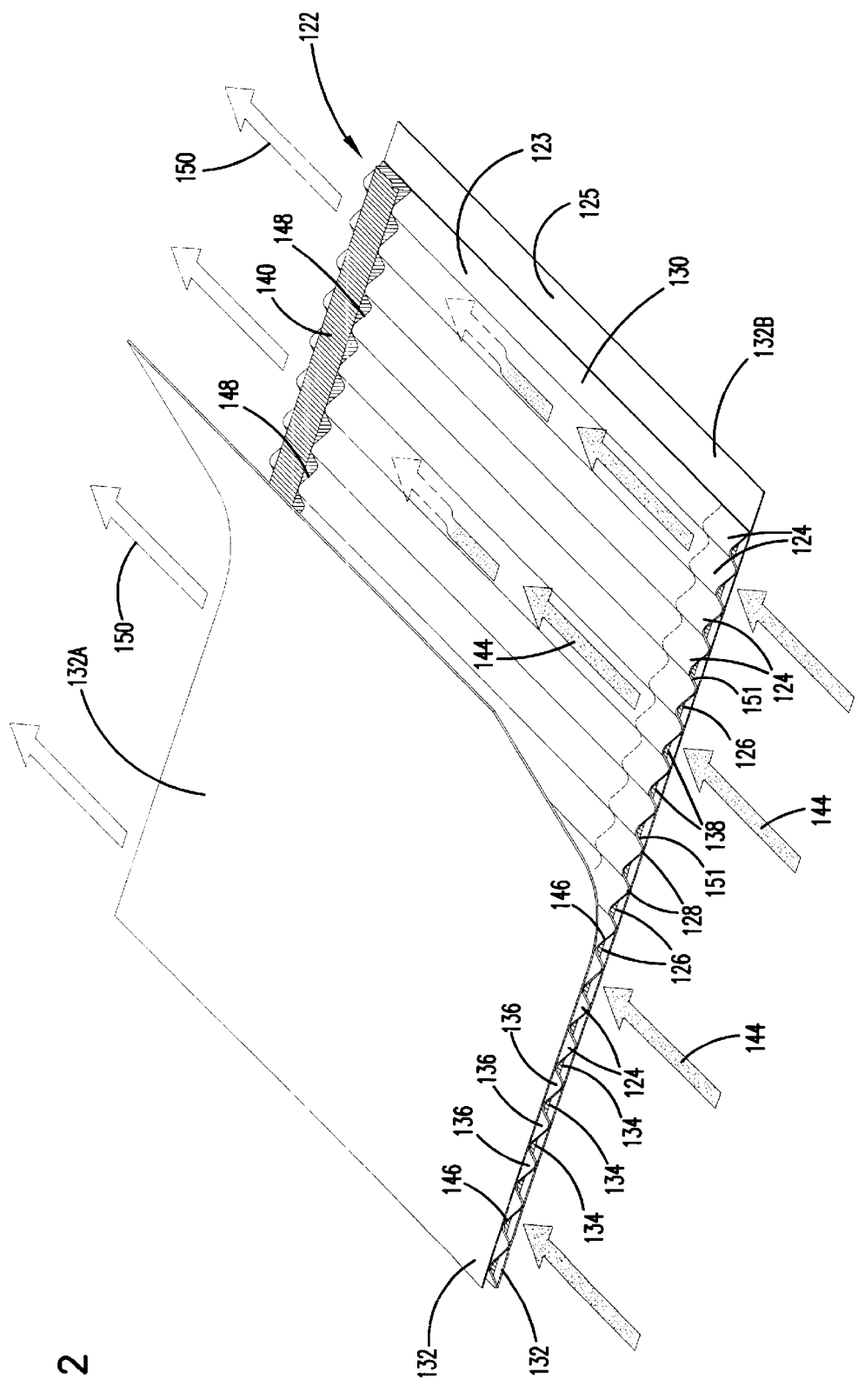
FIG. 2 is a schematic, perspective view of a portion of the filter media usable in the filter element depicted in FIG. 1, according to principles of the present disclosure.

Attention is now directed to FIG. 2. FIG. 2 is schematic, perspective view demonstrating the principles of operation of certain preferred media usable in the filter constructions herein. In FIG. 2, a fluted construction is generally designated at 122. Preferably, the fluted construction 122 includes: a layer 123 of corrugations having a plurality of flutes 124 and a face sheet 132. The FIG. 2 embodiment shows two sections of the face sheet 132, at 132A (depicted on top of the corrugated layer 123) and at 132B (depicted below the corrugated layer 123). Typically, the preferred media construction 125 used in arrangements described herein will include the corrugated layer 123 secured to the bottom face sheet 132B. When using this media construction 125 in a rolled construction, it typically will be wound around itself, such that the bottom face sheet 132B will cover the top of the corrugated layer 123. The face sheet 132 covering the top of the corrugated layer is depicted as 132A. It should be understood that the face sheet 132A and 132B are the same sheet 132.

When using this type of media construction 125, the flute chambers 124 preferably form alternating peaks 126 and troughs 128. The troughs 128 and peaks 126 divide the flutes into an upper row and lower row. In the particular configuration shown in FIG. 2, the upper flutes form flute chambers 136 closed at the downstream end, while flute chambers 134 having their upstream end closed form the lower row of flutes. The fluted chambers 134 are closed by a first end bead 138 that fills a portion of the upstream end of the flute between the fluting sheet 130 and the second facing sheet 132B. Similarly, a second end bead 140 closes the downstream end of alternating flutes 136. In some systems, both the first end bead 138 and second end bead 140 are straight along all portions of the media construction 125, never deviating from a straight path. In some systems, the first end bead 138 is both straight and never deviates from a position at or near one of the ends of the media construction 125, while the second end bead 140 is both straight and never deviates from a position at or near one of the ends of the media construction 125.

When using media constructed in the form of media construction 125, during use, unfiltered fluid, such as air, enters the flute chambers 136 as indicated by the shaded arrows 144. The flute chambers 136 have their upstream ends 146 open. The unfiltered fluid flow is not permitted to pass through the downstream ends 148 of the flute chambers 136 because their downstream ends 148 are closed by the second end bead 140. Therefore, the fluid is forced to proceed through the fluting sheet 130 or face sheets 132. As the unfiltered fluid passes through the fluting sheet 130 or face sheets 132, the fluid is cleaned or filtered. The cleaned fluid is indicated by the unshaded arrow 150. The fluid then passes through the flute chambers 134 (which have their upstream ends 151 closed) to flow through the open downstream ends out the fluted construction 122. With the configuration shown, the unfiltered fluid can flow through the fluted sheet 130, the upper facing sheet 132A, or lower facing sheet 132B, and into a flute chamber 134.

Typically, the media construction 125 will be prepared and then wound to form a rolled construction of filter media. When this type of media is selected for use, the media construction 125 prepared includes the sheet of corrugations 123 secured with the end bead 138 to the bottom face sheet 132B (as shown in FIG. 2, but without the top face sheet 132A). In these types of arrangements, the media construction 125 will include a leading edge at one end and a trailing edge at the opposite end, with a top lateral edge and a bottom lateral edge extending between the leading and trailing edges. By the term "leading edge", it is meant the edge that will be initially turned or rolled, such that it is at or adjacent to the center or core of the rolled construction. The "trailing edge" will be the edge on the outside of the rolled construction, upon completion of the turning or coiling process.

The leading edge and the trailing edge should be sealed between the corrugated sheet 123 and the bottom face sheet 132B, before winding the sheet into a coil, in these types of media constructions 125. While a number of ways are possible, in certain methods, the seal at the leading edge is formed as follows: (a) the corrugated sheet 123 and the bottom face sheet 132B are cut or sliced along a line or path extending from the top lateral edge to the bottom lateral edge (or, from the bottom lateral edge to the top lateral edge) along a flute 124 forming a peak 126 at the highest point (or apex) of the peak 126; and (b) sealant is applied between the bottom face sheet 132B and the sheet of corrugations 123 along the line or path of cut. The seal at the trailing edge can be formed analogously to the process of forming the seal at the leading edge. While a number of different types of sealant may be used for forming these seals, one usable material is a non-foamed sealant available from H.B. Fuller, St. Paul, Minn., identified under the designation HL0842.

When using the media constriction 125, it may be desired by the system designer to wind the construction 125 into a rolled construction of filter media, such as the filter element 10 of FIG. 1. A variety of ways can be used to coil or roll the media. For example, the media construction 125 can be wound about a center core 30 or other element to provide a mounting member for winding. When in the roiled construction, the flute chambers 136 have a longitudinal direction that extends between the first end 20 of the filter element 10 and the second end 22 of the filter element 10.

In constructing the filter element 10, typically, a single faced filter media, such as filter media 122 illustrated in FIG. 2, is wound around central core 30 (FIG. 1) in a coil or spiral pattern thereabout. In the embodiment shown, the core 30 is a noncircular, elongated member. In other embodiments, the core 30 may be circular or non-elongated, such as square or other shapes. When manufacturing the filter element 10, the layer of media 122 is securely attached to the core 30, to block any gas flow between the core 30 and the first coil or spiral layer of media 122.

In preferred arrangements, the core 30 extends the entire axial length of the filter element 10 between the first end 20 and the second end 22. As will be explained in further detail below, in certain preferred embodiments, the core 30 includes portions that extend or axially project over or above the first end 20 to cooperate with the handle system 14.

When using rolled constructions such as the filter element 10, the system designer will want to ensure that the outside periphery of the element 10 is closed or locked in place to prevent the filter element 10 from unwinding. There are a variety of ways to accomplish this. In some applications, the outside periphery is wrapped with a periphery layer. The periphery layer can be a non-porous, adhesive material, such as plastic with an adhesive on one side. When this type of layer is utilized, the periphery layer prevents the filter construction 10 from unwinding and prevents the fluid from passing through the outside periphery of the filter construction 10, maintaining straight-through flow through the filter construction 10.

In some applications, the filter element 10 is secured in its rolled construction by sealing the trailing edge of the media construction 125 with an adhesive or sealant along a line 160 (FIG. 1) to secure the trailing edge to the outside surface of the filter element 10. For example, a bead of hot-melt may be applied along the line 160.

Referring again to FIG. 1, note the cross-sectional shape of the filter element 10 is non-circular. While the cross-section could be circular, due to the geometry of the volume that the filter element 10 is installed within, it is sometimes convenient in certain applications to have a non-circular cross-section. This cross-section permits a relatively large amount of media to economically occupy a small volume. In some preferred constructions, the cross-sectional configuration of the filter element 10 will be ob-round. In the particular embodiment shown in FIG. 1, the filter element 10 defines a cross-section that is racetrack shaped. By "racetrack shaped," it is meant that the filter element 10 defines a semicircular end 40 and an opposite semicircular end 42. The semicircular ends 40 and 42 are joined by a pair of straight segments 44, 46.

In preferred constructions, the filter element 10 will include the handle system 14 secured to the filter element 10. The handle system 14 is preferably constructed and arranged to accommodate a grasping force applied by portions of a human hand. This permits convenient manipulation and handling of the filter element 10, particularly during servicing or change out.

In preferred systems, the handle system 14 is secured to the element 10, such that a pulling force applied to the handle system 14 will translate into a pulling force applied to the filter element 10. In most preferred systems, the handle system 14 will be secured to the core 30. As such, portions of the media 12 will not need to have obstructions or other connections made to accommodate a handle system 14.

The handle system 14 can be secured to the core 30 in a variety of ways. For example, the handle system 14 may be glued, attached with mechanical fasteners such as screws, or tied with a tether mechanism. Further, the handle system 14 can include an elongate rod pivotally attached through a hinge or mechanical fasteners to the core 30.

Still in reference to FIG. 1, the handle system 14 in the particular embodiment shown is integral with the core 30. Further, in the preferred embodiment shown in FIG. 1, the handle system 16 is molded as a single piece with the core 30. This single piece molding permits expedient, convenient manufacturing and assembly.

Preferably, the handle system 14 includes an aperture 50 defined by the core 30 and passing completely through the core 30. In certain preferred arrangements, the aperture 50 includes no more than a single aperture penetrating the core 30. In the embodiment shown in FIG. 1, the aperture 50 includes a single elongate slot 58. Preferably, the slot 58 is sized to accommodate portions of a user's hand, such as 3 or 4 fingers of an average human hand. The user may then insert his fingers into the slot 58, grasp the portion 62 of the handle system 14, and manipulate the filter element 10.

In preferred embodiments, the aperture 50 surrounds a respective axis that is normal to the longitudinal direction of the flute chambers 124.

Figure 5:
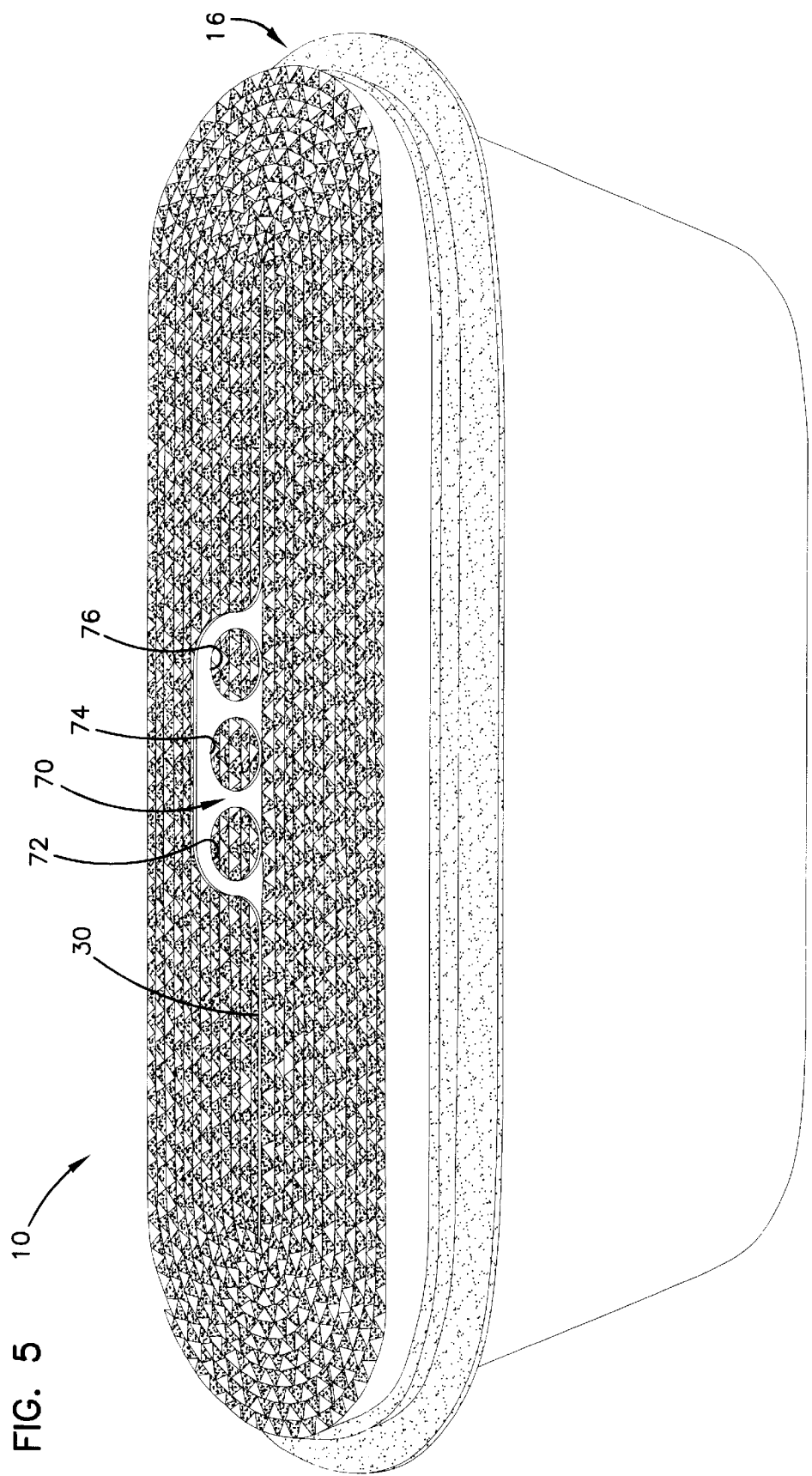
FIG. 5 is a perspective view of a second embodiment of a filter element, according to principles of the present disclosure.

Attention is directed to FIG. 5. In certain embodiments, the handle system 14 includes more than one aperture, that is a plurality or multiple apertures 70. In the embodiment shown in FIG. 5, there are no more than 3 apertures, 72, 74, 76. In other embodiments, there may be only 2 apertures, or only 4 apertures. Each of the apertures 72, 74, and 76 are circular in shape. Preferably, each of the apertures 72, 74, 76 have a diameter large enough to accommodate human fingers and human fingers protected by gloves.

Attention is directed to FIG. 3. In FIG. 3, a sealing system 16 is shown in side elevation. The sealing system 16 will typically include a seal member or gasket 90 secured to the outer periphery of the filter element 10. In some embodiments, the seal member 90 can include a seal member defining a circular cross-section. In the embodiment shown in FIG. 3, the seal member 90 defines an L-shaped cross-section. In particular, a band 92 circumscribes the filter element 10 and includes a surface that is substantially parallel to the sidewall of the filter element 10. There is a projecting flange 94 extending or projecting from the band 92. When inserted in a duct, the flange 94 will typically deflect and angle toward the band 92 to help create a lip seal or an axial type seal.

FIG. 4 illustrates an alternative embodiment of the seal member 90. In FIG. 4, the band 96 is oriented below the projecting flange 98. In this embodiment, when the filter element 10 is installed in a duct, the flange 98 bends or deflects away from the band 96 and toward the first end 20 of the filter element 10.

Additional views of filter element 10 are depicted in co-pending, commonly assigned, U.S. patent application Ser. No. 29,101,304, entitled, "Filter Element Having Handle," filed on the same date herewith, which application is herein incorporated by reference.

B. Example System. FIG. 6

Attention is directed to FIG. 6. FIG. 6 depicts and example system 100 that the filter element 10 is usable. The system 100 includes a apparatus 104, such as an air cleaner like a shop-vacuum or other similar apparatus. The apparatus 104 will typically have a motor 106 powering a fan in order to induce a vacuum therethrough. The filter element 10 can be installed in a duct 110, with the seal member 90 creating a seal 112 between the filter element 10 and the duct 110. One example of a typical system is described in co-pending, commonly assigned, U.S. patent application Ser. No. 09/251,022, entitled, "Air Filter Arrangement and Methods", filed the same date herewith, and which application is herein incorporated by reference.

In operation, gas, such as particulate laden air is drawn into the apparatus 104 as shown at arrow 114. The gas then is drawn through the filter element 10 and cleaned of particulate matter. Cleaned air or gas is then exhausted from the apparatus 104 through an outlet as shown at arrow 116. In some systems, it may be desirable to include an optional prefilter 118, such as a sieve or screen upstream of the filter element 10 to remove any large contaminants or debris from the incoming gas 114.

After a period of use, the filter element 10 will need to be serviced. For example, when the filter element 10 becomes occluded and introduces a high restriction into the system 100, the filter element 10 should be changed out. This can be done by accessing the interior of the apparatus 104. The handle system 14 may then be grasped with the user's hand. For example, the user's fingers will penetrate the aperture 50 defined by the core 30. The user will then exert a pulling force on the handle 14 which will translate into a pulling force on the filter element 10. When pulling the filter element 10, the seal 112 is broken between the duct 110 and the filter element 10. The filter element 10 is then removed from the apparatus 104. The element 10 can be cleaned and replaced, or the filter element 10 can be disposed of and replaced with a new, second filter element. To clean the filter element 10, the element can be oriented such that the flutes with the open upstream end are oriented downwardly. The user may tap on the downstream end of the element to dump out the collected contaminants, dust, or debris that has collected within these flutes. The pulling force required to break the seal 112 and remove the element 10 from the duct 110 is low enough that it can be done by hand. For example, a pulling force no greater than 50 lbs., typically less that 30 lbs., and in some arrangements less than 15 lbs. will be required.

The filter element 10 may then be reinstalled in the apparatus 104. This may be done by grasping the handle system 14 and inserting the element 10 into the duct 110. The element 10 is inserted until a seal 112 is created between the duct 110 and the filter element 10. The user may then let go or release the handle system 14 and close the access port to the apparatus 104.

C. Example Materials

The following section provides certain example materials that are usable in the arrangements and constructions described herein. Other materials are usable.

The filter media 12 can be cellulose media with the following properties: a basis weight of about 52 lbs./3000 ft$^2$ (84.7 g/m$^2$); a thickness of about 0.010 in. (0.25 mm); frazier permeability of about 22 ft/min (6.7 m/min); pore size of about 62 microns; wet tensile strength of about 8.5 lbs./in (3.9 kg/in); burst strength wet off of the machine of about 23 psi (159 kPa). The cellulose media can be treated with fine fiber, for example, fibers having a size (diameter) of 5 microns or less, and in some instances, submicron. A variety of methods can be utilized for application of the fine fiber to the media. Some such approaches are characterized, for example, in U.S. Pat. No. 5,423,892, column 32, at lines 48–60. More specifically, such methods are described in U.S. Pat. Nos. 3,878,014; 3,676,242; 3,841,953; and 3,849,241, incorporated herein by reference. Another alternative is a trade secret approach comprising a fine polymeric fiber web positioned over conventional media, practiced under trade secret by Donaldson Company under the designation ULTRA-WEB®. With respect to the configurations of the filter element and the operation of the handle, there is no particular preference for: how the fine fibers are made; and, what particular method is used to apply the fine fibers. Enough fine fiber would be applied until the resulting media construction would have the following properties: initial efficiency of 99.5% average, with no individual test below 90%, tested according to SAE J726C, using SAE fine dust; and an overall efficiency of 99.98% average, according to SAE J726C.

The core 30 may be constructed of a material that will provide structural integrity and will not be subject to creep. In preferred arrangements, the core 30 will be constructed of a non-metallic material, such that it is environmentally friendly and either recyclable or readily incineratable. The core 30, including the handle system 14, can be constructed from most plastics, for example, polyproplene, ABS, or nylon. In addition, the core 30 may also be constructed from hard paper board.

The seal member 90 will be constructed of a soft, compressible material. For example, the seal member 90 can be constructed of polyurethane having a density of about 2–10 lb/ft$^3$.

D. Example Dimensions

The following section provides example constructions and dimensions. Depending upon the particular application, other constructions and dimensions are usable.

The filter element 10 will have an ob-round or racetrack shaped cross-section. The width between the opposite straight segments 44, 46 can range between 2–10 inches, and in one example is about 5 inches. The length between the opposite semi-circular ends 40, 42 can range between 5–30 inches, for example 15–25 inches, and in one example is about 18 inches. The height between the first end 20 and second 22 can range between 2–30 inches, for example 5–15 inches, and in one example would be about 8–12 inches. The filter element will provide at least 30 sq. ft and typically 50–150 sq. ft., for example 70–100 sq. ft. of media surface area.

The handle system 14 will project about the first end 20 by a distance ranging between 0.5–5 inches, for example, 0.75–2 inches, and in one example would be about 1 inch.

The slot 58 will define an open area of between 2–20 in$^2$, for example between 3–8 in$^2$, and in one example would be about 4 in.

Each of the apertures 74, 76, and 78 would have a diameter of between 0.75–3 inches, for example, about 1 inch.

The above specification, examples and data provide a complete description of the manufacture and use of the invention. Many embodiments of the invention can be made.

I claim:

1. A filter arrangement comprising:
   (a) a filter element having opposite first and second ends; said filter element comprising: a shoot of corrugated filter media; and a sheet of non-corrugated media oriented adjacent to said at least one sheet of corrugated media;
   (i) said sheet of corrugated filter media and said sheet of non-corrugated media being attached to each other and having a rolled construction;
   (ii) said sheet of corrugated filter media comprising alternating peaks and troughs forming a plurality flutes;
      (A) each of said flutes having a first end portion adjacent to said filter element first end, and a second end portion adjacent to said filter element second end; said flutes having a longitudinal direction extending between said first end portion and said second end portion;
      (B) selected ones of said flutes being open at said first end portion and sealed closed at said second end portion; and
      (C) selected ones of said flutes being scaled closed at said first end portion and open at said second end portion; and
   (b) a handle member projecting axially from said first end of said filter element to permit manipulation of said filer element; said handle member having at least a single aperture surrounding a respective axis that is normal to said longitudinal direction of said plurality of flutes.

2. A filter arrangement according to claim 1 wherein:
   (a) said handle member is sized to accommodate a portion of a human hand inserted between a portion of said handle member and said first end of said filter element.

3. A filter arrangement according to claim 1 wherein:
   (a) said filter element includes a central core member; said rolled construction comprising a winding of said sheet of corrugated filter media and said sheet of non-corrugated media around said central core member.

4. A filter arrangement according to claim 1 wherein:
   (a) said central core member comprises an elongate, non-circular construction; and
   (b) said handle member and said central core member are an integral, single-molded construction.

5. A filter arrangement according to claim 4 wherein:
   (a) said filter element has a cross-section comprising a pair of semi-circular ends joined by a pair of straight segments; said filter element cross-section being formed by a winding of said sheet of corrugated filter media and said sheet of non-corrugated media around said elongate, non-circular central core member.

6. A filter arrangement according to claim 1 wherein:
   (a) said at least single aperture has all area of at least 3 in$^2$.

7. A filter arrangement according to claim 1 wherein:
   (a) said handle member comprises no more than 3 apertures; each of said apertures being circular and having a diameter of at least 0.75 in.

8. A filter arrangement according to claim 1 wherein:
   (a) said filter element includes a seal member secured to said filter element.

9. A filter arrangement according to claim 1 further including:
   (a) at least a first sealant bead securing said sheet of non-corrugated media to said sheet of corrugated media.

10. A filter arrangement according to claim 1 wherein:
    (a) said filter element has a non-circular cross-section.

11. A filter arrangement comprising:
    (a) a filter element having opposite first and second ends; said filter element comprising:

(i) a sheet of corrugated filter media;
(ii) a sheet of non-corrugated media oriented adjacent to said sheet of corrugated media;
(iii) a central core member; and
(iv) at least a first sealant bead securing said sheet of non-corrugated media to said sheet of corrugated media;
  (A) said sheet of corrugated filter media and said sheet of non-corrugated media being attached to each other by said first sealant bead and having a rolled construction;
  (B) said sheet of corrugated filter media comprising alternating peaks and troughs forming a plurality flutes;
    (1) each of said flutes having a first end portion adjacent to said filter element first end, and a second end portion adjacent to said filter element second end; said flutes having a longitudinal direction extending between said first end portion and said second end portion;
    (2) selected ones of said flutes being open at said first end portion and sealed closed at said second end portion; and
    (3) selected ones of said flutes being sealed closed at said first end portion and open at said second end portion;
(b) a handle member projecting axially from said first end of said filter element to permit manipulation of said filter element;
  (i) said handle member being integral with said central core member;
    (A) said handle member and central core member comprising an elongate, non-circular construction;
    (B) said rolled construction comprising a winding of said sheet of corrugated filter media and said sheet of non-corrugated media around said handle member and said central core member; and
  (ii) said handle member including at least a single aperture having an area of at least 3 in$^2$; said single aperture surrounding a respective axis that is normal to said longitudinal direction of said plurality of flutes.

12. A filter arrangement according to claim 11 wherein:
(a) said filter element includes a seal member secured to said filter element.

13. A filter arrangement according to claim 12 wherein:
(a) and handle member comprises no more than 3 apertures; each of said apertures being circular and having a diameter tar tat least 0.75 in.

14. A filter arrangement according to claim 12 wherein:
(a) said filter element has a cross-section comprising a pair of semi-circular ends joined by a pair of straight segments.

15. A filter arrangement comprising:
(a) a filter element having opposite first and second ends; said filter element comprising:
  (i) a sheet of corrugated filter media;
  (ii) a sheet of non-corrugated media oriented adjacent to said sheet of corrugated media;
  (iii) a central core member; and
  (iv) at least a first sealant bead securing said sheet of non-corrugated media to said sheet of corrugated media;
    (A) said sheet of corrugated filter media and said sheet of non-corrugated media being attached to each other by said first sealant bead and having a rolled construction;
    (B) said rolled construction comprising a winding of said sheet of corrugated filter media and said sheet of non-corrugated media around said central core member;
    (C) said sheet of corrugated filter media comprising alternating peaks and troughs forming a plurality flutes;
      (1) each of said flutes having a first end portion adjacent to said filter element first end, and a second end portion adjacent to said filter element second end; said flutes having a longitudinal direction extending between said first end portion and said second end portion;
      (2) selected ones of said flutes being open at said first end portion and sealed closed at said second end portion; and
      (3) selected ones of said flutes being sealed closed at said first end portion and open at said second end portion;
(b) a seal member secured to said filter element; and
(c) a handle member projecting axially from said first end of said filter element to permit manipulation of said filter element;
  (i) said handle member being sized to accommodate a portion of a human hand inserted between a portion of said handle member and said first end of said filter element; said handle member having at least a single aperture surrounding a respective axis that is normal to said longitudinal direction of said plurality of flutes.

16. A filter arrangement according to claim 15 wherein:
(a) said handle member and said central core member are an integral, single-molded construction.

17. A filter arrangement according to claim 15 wherein:
(a) said filter element has a non-circular cross-section.

18. A filter arrangement according to claim 15 wherein:
(a) said central core member comprises an elongate, non-circular construction.

* * * * *

UNITED STATES PATENT AND TRADEMARK OFFICE
CERTIFICATE OF CORRECTION

PATENT NO. : 6,235,195 B1
DATED : May 22, 2001
INVENTOR(S) : Joseph C. Tokar

It is certified that error appears in the above-identified patent and that said Letters Patent is hereby corrected as shown below:

Column 7,
Line 64, delete "shoot" and insert -- sheet --;

Column 8,
Line 5, after "plurality" insert -- of --;
Line 17, delete "scaled" and insert -- sealed --;
Line 49, delete "all" and insert -- an --;

Column 9,
Line 13, after "plurality" insert -- of --;
Line 49, delete "and" and insert -- said --;
Line 51, delete "tar tat" and insert -- of at --; and Column 10,
Line 20, after "plurality" insert -- of --.

Signed and Sealed this

Thirteenth Day of August, 2002

Attest:

Attesting Officer

JAMES E. ROGAN
Director of the United States Patent and Trademark Office